United States Patent
Wingert

(10) Patent No.: US 6,672,034 B1
(45) Date of Patent: Jan. 6, 2004

(54) AGRICULTURAL FEED BAGGER AND METHOD

(76) Inventor: Paul R. Wingert, Rural Rte. 1 Box 192, Plainview, MN (US) 55964

( * ) Notice: Subject to any disclaimer, the term of this patent is extended or adjusted under 35 U.S.C. 154(b) by 0 days.

(21) Appl. No.: 09/721,268

(22) Filed: Nov. 22, 2000

(51) Int. Cl.$^7$ .................................. B65B 1/24
(52) U.S. Cl. .......................... 53/436; 53/459; 53/527; 53/567; 53/576
(58) Field of Search .................... 53/436, 438, 439, 53/459, 523, 526, 527, 529, 530, 567, 576; 141/73, 114

(56) References Cited

U.S. PATENT DOCUMENTS

| | | | |
|---|---|---|---|
| 3,179,131 A | * | 4/1965 | Kissling ............... 53/439 |
| 3,613,926 A | * | 10/1971 | Scroggins ............. 414/503 |
| 3,876,055 A | * | 4/1975 | Tyznik ................. 198/522 |
| 4,046,068 A | | 9/1977 | Eggenmuller et al. |
| 4,072,273 A | | 2/1978 | Reiniger |
| 4,100,023 A | | 7/1978 | McDonald |
| 4,310,036 A | | 1/1982 | Rasmussen et al. |
| 4,344,580 A | * | 8/1982 | Hoshall et al. .......... 241/60 |
| 4,502,378 A | | 3/1985 | Cullen |
| 4,584,790 A | * | 4/1986 | Gaughen |
| 4,611,642 A | | 9/1986 | Durhman |
| 4,621,666 A | | 11/1986 | Ryan |
| 4,672,794 A | | 6/1987 | Good |
| 4,686,817 A | | 8/1987 | Brodrecht et al. |
| 4,688,480 A | | 8/1987 | Ryan |
| 4,712,362 A | * | 12/1987 | Cornet et al. ........... 56/16.5 |
| 4,721,503 A | | 1/1988 | Rasmussen et al. |
| 4,724,876 A | | 2/1988 | Ryan |
| 4,867,736 A | | 9/1989 | Rasmussen et al. |
| 4,899,867 A | | 2/1990 | Ryan |
| 4,907,503 A | | 3/1990 | Ryan |
| 4,949,633 A | | 8/1990 | Johnson et al. |
| 5,140,802 A | | 8/1992 | Inman et al. |
| 5,178,061 A | | 1/1993 | Alonso-Amelot |
| 5,213,143 A | | 5/1993 | Policky et al. |
| 5,220,772 A | | 6/1993 | Koskela et al. |
| 5,295,554 A | | 3/1994 | Cullen |
| 5,297,377 A | | 3/1994 | Cullen |
| 5,313,768 A | | 5/1994 | Cullen |
| 5,345,744 A | | 9/1994 | Cullen |
| 5,355,659 A | | 10/1994 | Cullen |
| 5,367,860 A | | 11/1994 | Cullen |
| 5,396,753 A | | 3/1995 | Cullen |
| 5,398,736 A | | 3/1995 | Cullen |
| 5,408,809 A | | 4/1995 | Cullen |
| 5,408,810 A | | 4/1995 | Cullen |
| 5,413,155 A | | 5/1995 | Ryan |
| 5,419,102 A | | 5/1995 | Inman et al. |

(List continued on next page.)

*Primary Examiner*—Stephen F. Gerrity
(74) *Attorney, Agent, or Firm*—Schwegman, Lundberg, Woessner & Kluth, P.A.

(57) ABSTRACT

An improved agricultural feed stock loading apparatus that includes a feed tunnel. In various embodiments, the apparatus includes a multi-part tunnel system that can be removed from the bagger and/or adjusted in width and/or length for shipping and moving convenience, and to accommodate different-sized bags. Other embodiments include a foldable brake beam and shaft mechanism that facilitates shipping and road travel. Other embodiments include a feed wagon portion with a large buffer table as a unitary part of the bagger, facilitating depositing a large amount of feed onto the bagger, and freeing the loading machinery for other duties. Other aspects of the invention include a bag lift having a post that is located along the tunnel midline of the bagger, transport wheels moved towards the center of mass of the combined wagon table and bagger extruder, a slidable conveyor system to move feed along the buffer table, and/or an automatically moving side elevator that remains in a fixed position as the bagger machine is moved and the bag filled. In some embodiments, variable-speed hydraulic motors are used to drive the chains moving various parts of the bagger machine relative to one another.

22 Claims, 14 Drawing Sheets

U.S. PATENT DOCUMENTS

| | | |
|---|---|---|
| 5,421,142 A | 6/1995 | Cullen |
| 5,425,220 A | 6/1995 | Cullen |
| 5,426,910 A | 6/1995 | Cullen |
| 5,452,562 A | 9/1995 | Cullen |
| 5,461,843 A | 10/1995 | Garvin et al. |
| 5,463,849 A | 11/1995 | Cullen |
| 5,464,049 A | 11/1995 | Cullen |
| 5,469,693 A | 11/1995 | Brodrecht |
| 5,517,806 A | 5/1996 | Cullen |
| 5,566,532 A | 10/1996 | Inman et al. |
| 5,724,793 A | 3/1998 | Inman et al. |
| 5,799,472 A * | 9/1998 | Cullen .......................... 53/527 |
| 5,860,271 A * | 1/1999 | Inman et al. .................. 53/436 |
| 5,894,713 A * | 4/1999 | Cullen .......................... 53/436 |
| 6,430,897 B1 * | 8/2002 | Cameron et al. .............. 53/436 |

\* cited by examiner

AGRICULTURAL FEED BAGGER AND METHOD

FIELD OF THE INVENTION

This invention relates to the field of loading compressible, agricultural feed stock into expandable storage bags, and more specifically to an improved method and apparatus having an expanded loading area for easier input of feedstock to the bagger machine and retractable portions for easier transport of the machine.

BACKGROUND OF THE INVENTION

Horizontally expandable, silage storage bags are commonly used as an alternative to permanent feed storage structures such as barns and silos. From an economic standpoint, an expandable plastic storage bag is preferable to a more elaborate, permanent structure. Further, the expandable bags are more easily loaded with feed than permanent structure and the silage stored therein is readily accessible for use, for example using a small tractor with a front bucket to unload the feed.

An exemplary prior art bagger is described in U.S. Pat. No. 5,878,552 (which patent is incorporated herein in its entirety by reference), to Paul Wingert, the present applicant. A tractor-powered bag-loading apparatus is disclosed in association with an expandable bag. A backstop is located at the filled end of the bag and has attached thereto laterally spaced cables which extend forward to rotatable cable drums on the bagger machine. The drums are yieldably braked and, under a predetermined force applied to the cables, release the cable to allow movement of the bag-loading apparatus and tractor away from the filled end of the bag as it is filled. The bag is filled by a toothed rotor which propels silage through a tapered tunnel and into the bag inlet. The tapered tunnel described in U.S. Pat. No. 5,878,552 provides a smooth, more evenly filled bag.

The bag for use with such bagging machines is manufactured and delivered in a pleated shape, i.e., folded into an accordion-bellows-type shape. Typically, a bag having a nominal ten-foot-diameter (approximately 3 meters diameter, or 9.6 meters circumference) and a 300-foot length (approximately 90 meters length) will be folded to a 10-foot-diameter (about 3 meters) ring about one foot (about 0.3 meter) long and 1 foot (about 0.3 meter) thick. To start the loading operation, this bag-ring is pre-loaded around the tunnel, and the pleats are unfolded one at a time as the bag is deployed and filled with feed stock. Once any portion of the bag fills with feed, that portion becomes very heavy, and does not move. Thus the bagger machine itself is propelled along the ground in front of the bag being filled.

There are numerous problems that one contends with using previous bagging structures. The loading area is relatively small and that loading area moves as the bagger moves due to feed being forced into the bag. It is thus difficult to dump large quantities of feed at one time into the bagger, for example from a dump truck or large front-end loader.

Further, various parts of conventional bagger machines are oriented such that a very wide profile is presented as the bagger is transported. For example, the yieldably braked, rotatable cable drums holding the laterally spaced cables which extend back to the backstop and the end of the filling bag are typically placed at the ends of an axle that is long enough to space the cables at either side of a ten-foot or twelve-foot diameter bag. In rural farm regions, particularly remote or mountainous regions, that have narrow roads, it is problematic to move such a wide bagger from place to place. Further, shipping bagger machines overseas often involves packing the bagger into a standard container having predefined interior dimensions not suitable for wide and long machines.

What is needed is a apparatus and method for bagging agricultural feed that provides a large loading area for dumping input feed that is to be bagged, as well as having a narrow profile for transport and a wide profile for operation.

SUMMARY OF THE INVENTION

The present invention provides an improved agricultural feed stock loading apparatus that includes a feed tunnel. In various embodiments, the apparatus includes a multi-part tunnel system that can be removed from the bagger and/or adjusted in width and/or length for shipping and moving convenience, and to accommodate different-sized bags. Other embodiments include a foldable brake beam and shaft mechanism that facilitates shipping and road travel. Other embodiments include a feed wagon portion with a large buffer table as a unitary part of the bagger, facilitating depositing a large amount of feed onto the bagger, and freeing the loading machinery for other duties.

Other aspects of the invention include a bag lift having a post that is located along the tunnel midline of the bagger, transport wheels moved towards the center of mass of the combined wagon table and bagger extruder, a slidable conveyor system to move feed along the buffer table, and/or an automatically moving side elevator that remains in a fixed position as the bagger machine is moved and the bag filled. In some embodiments, variable-speed hydraulic motors are used to drive the chains moving various parts of the bagger machine relative to one another.

In some embodiments, the tunnel includes slidable portions that allow adjustment of the tunnel width for different sized bags.

One aspect of the present invention provides an improved method for loading agricultural feed into a horizontally deployed bag. This method includes providing an extruder rotor having an input hopper and an output tunnel, the input hopper having a capacity to hold feed, providing a buffer table having a capacity to hold feed that is larger than the capacity of the hopper, and deploying the bag from the forward end of the tunnel towards a rearward end of the tunnel. This method also includes unloading onto the buffer table an amount of feed that is greater than the capacity of the hopper, conveying the feed along the buffer table towards and into the hopper, compacting the feed with the extruder rotor, from the tunnel forward end, into the tunnel between the forward and rearward ends, and extruding the feed from the rearward end of the tunnel into the bag.

Another aspect of the present invention provides an agricultural feed stock loading apparatus for loading feed into a feed bag. This apparatus includes an extruder rotor having an input hopper and an output tunnel, the input hopper having a capacity to hold feed, a buffer table having a capacity to hold feed that is larger than the capacity of the hopper, the buffer table coupled to the input hopper, a bag holder that holds the bag to be deployed from the forward end of the tunnel towards a rearward end of the tunnel, and a mechanism that moves the feed along the buffer table towards and into the hopper.

Yet another aspect of the present invention provides an improved feed tunnel for use with an agricultural feed stock loading apparatus for loading feed into a horizontal, ground-supported feed bag. This tunnel includes at least two parts that can be attached to one another in a first configuration suitable to fill a bag having a first diameter, and can be attached to one another in a second configuration suitable to fill a bag having a second diameter larger than the first diameter.

BRIEF DESCRIPTION OF THE DRAWINGS

FIG. 6A shows system 500 in one position as upper hinge plate 413 is lifted.

FIG. 6B shows system 500 in another position as upper hinge plate 413 is lifted.

FIG. 6C shows system 500 in another position as upper hinge plate 413 is lifted.

FIG. 6D shows system 500 in another position as upper hinge plate 413 is lifted.

FIG. 6E shows system 500 in another position as upper hinge plate 413 is lifted.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
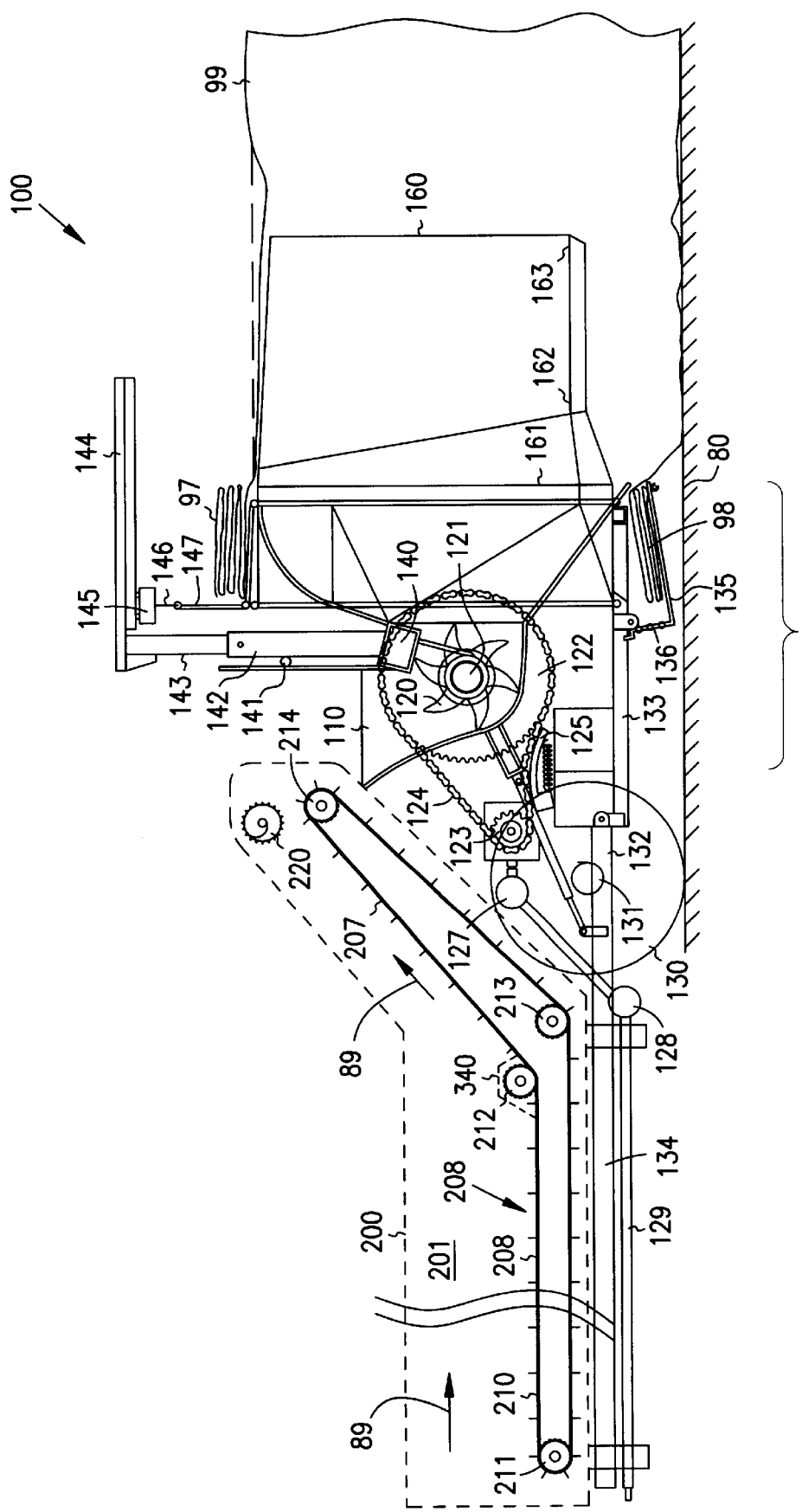
FIG. 1 shows a side view, partially in cross section, of one embodiment of the present invention, agricultural bagger system 100.

FIG. 1 shows a side view, partially in cross section, of one embodiment of the present invention, agricultural bagger system 100. Bagger system 100 includes two major portions, loading table wagon 200, and feed-compressor (and bag-unfolder-tunnel-extruder) portion 101. In some embodiments, loading table wagon 200 includes a loading table 208 surrounded by wagon sides 201, wherein the feed unloaded onto table 208 is moved by bars 209 that are driven by chains 210. Bars 209 move the feed rearwards along table 208 and up incline 207 into hopper 110. This conveying system, in some embodiments, includes chains 210 that are driven around a number of sprockets, for example, front-end sprocket 211, upper hold-down sprocket 212, lower hold-down sprocket 213, and upper-rear-end sprocket 214. In some embodiments, a toothed auger 220 helps to even out the top portion of the feed being moved up the loading table into hopper 110.

In operation, a large pile of feed can be dumped onto table 208. For example, a dump truck or large front-end loader can dump their entire load of feed onto table 208, freeing that truck or loader equipment to do other work, rather than it and its operator having to wait around for that load of feed to be packed into bag 99. The dumped feed is moved by bars 209 in the direction of the arrows towards the back of the machine 100. The pile will typically be too tall in the center and too low at the edges for even loading when it reaches auger 220, and thus auger 220 reduces the height to a predetermined height, as well as spreading the feed evenly across the entire width of input hopper 110. In some embodiments, the incline of table 208 between sprocket 212 and sprocket 214 is designed to be sufficiently flat to prevent excessive amounts of feed rolling down its incline, but also sufficiently steep so that feed can be knocked down by auger 220 rather than flowing over that auger 220. In some embodiments, tapered covers 340 attached to walls 201 of wagon 200 cover the middle sprockets 212 (which otherwise extend up into the feed, and which can then get clogged).

In some embodiments, the feed-compressor portion 101 and the loading table wagon portion 200 are held together by framing members, for example, wagon frame 134, middle frame 132, and bagger frame 133, along with a suitable number of appropriately placed bracing members. In some embodiments, a single pair of wheels 130 connected by wheel axle 131 located approximately in the middle of bagger system 100 are provided to transport bagger system 100, as well as to allow movement of bagger system 100 as the feed is compressed into filled bag 99 and the system moves along as the bag unfolds and is filled with compressed feed. In some embodiments, two wheels 130 mounted to axle 131 are provided for transporting bagger system 100. Axle 131 is placed just enough behind the forward/back center of mass to place sufficient towing weight onto the trailer tongue 310 (see FIG. 3) and to reduce sway as bagger system 100 is pulled by a tractor or truck down a highway or road. In some embodiments, tunnel 160 is made lower and wider than prior bagger machines, in order to produce a more stable filled bag 99.

Feed-compressor portion 101 includes a hopper 110 that feeds the input feed being compressed into compression teeth 120 (of compression rotor 121) which rotate (counterclockwise in the view shown in FIG. 1) and push the feed rearwards into bag 99, shown to the right of FIG. 1.

Drive compression teeth 120 are rotated around an axle driven by main sprocket 122 which in turn is driven by chain 124 from drive sprocket 123. Drive sprocket 123 is driven by an axle from transmission 170 which is driven from a series of drive shafts connected through universal joints from the front of the machine; for example, drive shaft 129, front U-joint 128, axle portion 171, and rear U-joint 127. Drive shaft 129 is typically driven from the power-take-off (PTO) of the tractor (not shown) used to power machine 100.

In some embodiments, one or more of sprockets 211, 212, 213, and/or 214 are also driven from PTO axle 129. In other embodiments, a hydraulic motor (not shown) is used to drive one or more of sprockets 211, 212, 213, and/or 214. These sprockets are driven to move the feed at a speed that matches the capability of auger 220 to evenly spread the feed side-to-side without the feed going over auger 220, and at a speed sufficiently slow that hopper 110 is not overfilled, and sufficiently fast that hopper 110 is not allowed to go empty for too long when feed is available on table 208.

In some embodiments, tunnel has a vertical cross-section area that enlarges (providing a buffer volume that is filled with feed by teeth 120) and then reduces in size over an extended length (providing an extrusion function that evens pressure and provides a smooth bag having a reduced amount of entrapped air, compared to tunnels that are shorter or that do not reduce in size). In some embodiments, a bagger machine having a conventional tunnel is modified by cutting the conventional tunnel approximately at line 161, and welding in its place an extended-length extrusion tunnel 160, having a gradually widening width from line 161 to wide point 162, and then a tapering shape to end point 163. Thus, tunnel 160 has a narrower width side-to-side at end 163 than at wide point 162. Bag 99 is slightly stretched after it unfolds and passes over wide point 162, and then tapers as it continues to the end 163 of tunnel 160. Variations in feed pressure are not applied to bag 99 as in conventional baggers having short, non-egg-shaped tunnels, but rather are absorbed by compaction of the feed in tunnel 160, and the feed exiting tunnel 160 is thus at a more even pressure. Thus filled bag 99 is smoother and more evenly packed.

Figure 10:
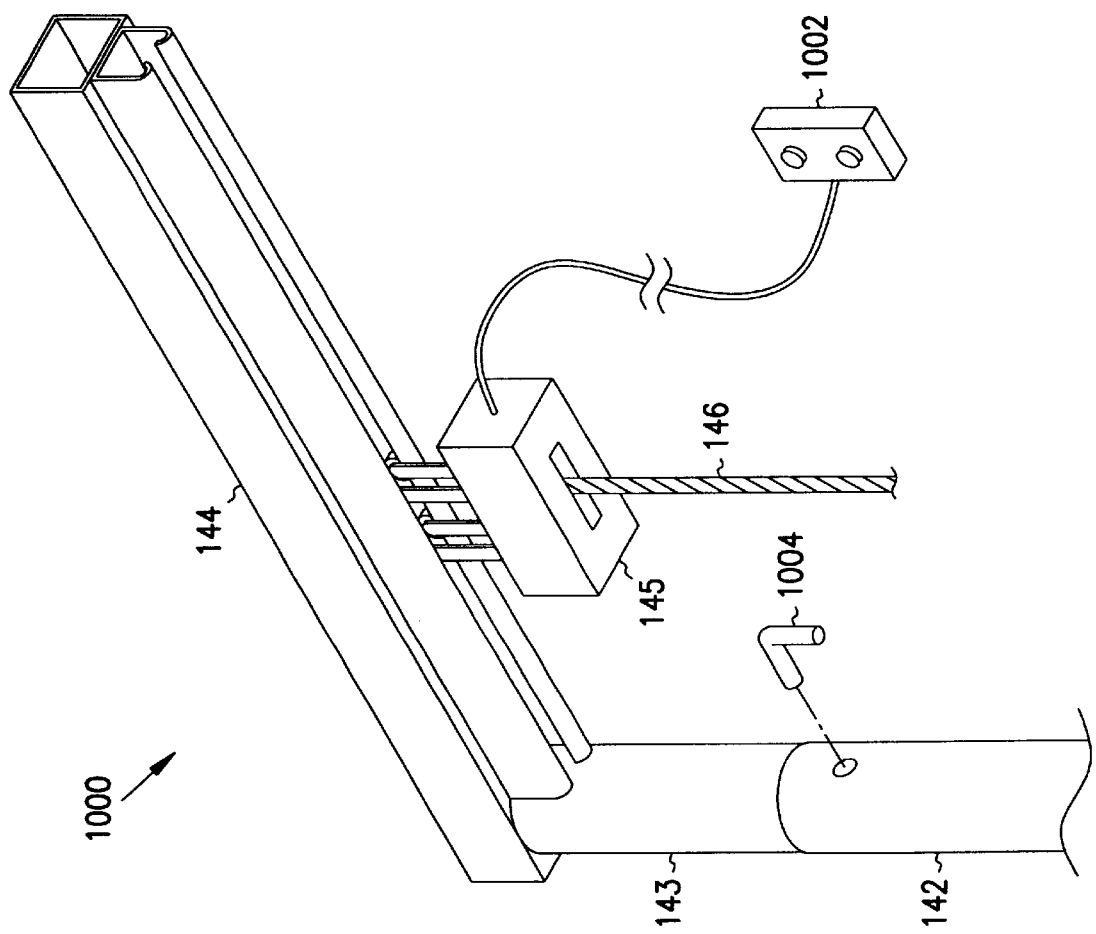
FIG. 10 shows a perspective view of one embodiment of the present invention, bag-crane system 1000.

As the feed is forced into bag 99, the bag is unfolded from folded bag portion 97, which is held by upper bag tray 147 and lower bag tray 135. Lower bag tray 135 has an adjustable-height attachment 136 at its forward end (e.g., a plurality of steel-bar loops at varying heights, one of which is hooked onto a complementary bracket on frame member 133), and a spring-loaded support at its rearward end. Upper bag tray 147 is typically held in place on the top of the machine, but is also movable in order to load the folded bag into place using crane 140. In some embodiments, crane 140 includes lower crane post 142 and adjustable upper crane post 143, crane arm 144, bag lifter winch 145, winch cable 146, along with upper bag tray 147. Further details of crane 140 are shown in FIG. 10.

In some embodiments, a brake system that includes brake axle 141 is used to hold bagger system 100 in tension relative to the end of filled bag 99 in order that the feed is compressed as it is forced and extruded through tunnel 160 into filled bag 99. For example, in some embodiments, axle 141 connects to two cable drums or spools 450, and is controlled by a disk brake 451 (see FIG. 7). In some embodiments, a hinged, folding mechanism 410 (see FIG. 4 below) is provided in order to fold the brake system to a more compact form factor for containerized shipping, and for traveling along narrow farm roads.

In some embodiments, tunnel 160 includes an egg-shaped middle section (or flat sections that expand, and then contract the tunnel diameter) wherein from a front tunnel line 161, the tunnel expands to tunnel-widening point 162 and then narrows again to the rear tunnel end 163. This provides a tension and extrusion function to more evenly compress the feed being pushed into the filled bag 99 and provide a smoother, more even filled bag with less air gaps and thus, less spoilage.

System 100 provides a unitary bagger machine having a large buffer volume (above buffer table 208) onto which a large amount of feed can be quickly unloaded from any type of loading machinery such as tractors front-end or wheel loaders, dump trucks, etc. The capacity of the buffer table is substantially greater than the capacity of the input hopper 110. This frees the machinery to leave as soon as the feed is dumped onto table 208, as contrasted with conventional baggers with which that machinery would need to wait and slowly unload their feed at a rate that the hopper could handle. This unloading machinery can then do other tasks, such as gathering more feed, while the unloaded feed is conveyed along table 208, up inclined table section, and into hopper 110. The pile of feed left on table 208 is moved into hopper 110 at a rate determined by the rate that feed is packed into bag 99. In some embodiments, a sensor is provided to determine the amount of feed in hopper 110, and to automatically activate the drive motor(s) for sprockets 211, 212, 213, and/or 214 that move the chains that move the feed along buffer table 208. By providing the buffer capacity of wagon table loader system 200, the machinery unloading feed to be bagged can unload at a much faster rate, determined by how fast the feed can be moved onto wagon table loader system 200. This increases the efficiency of the unloading machinery (which can do more work) as well as the bagger system 100, since there is less idle time waiting for the machinery to fetch another load.

Figure 2:
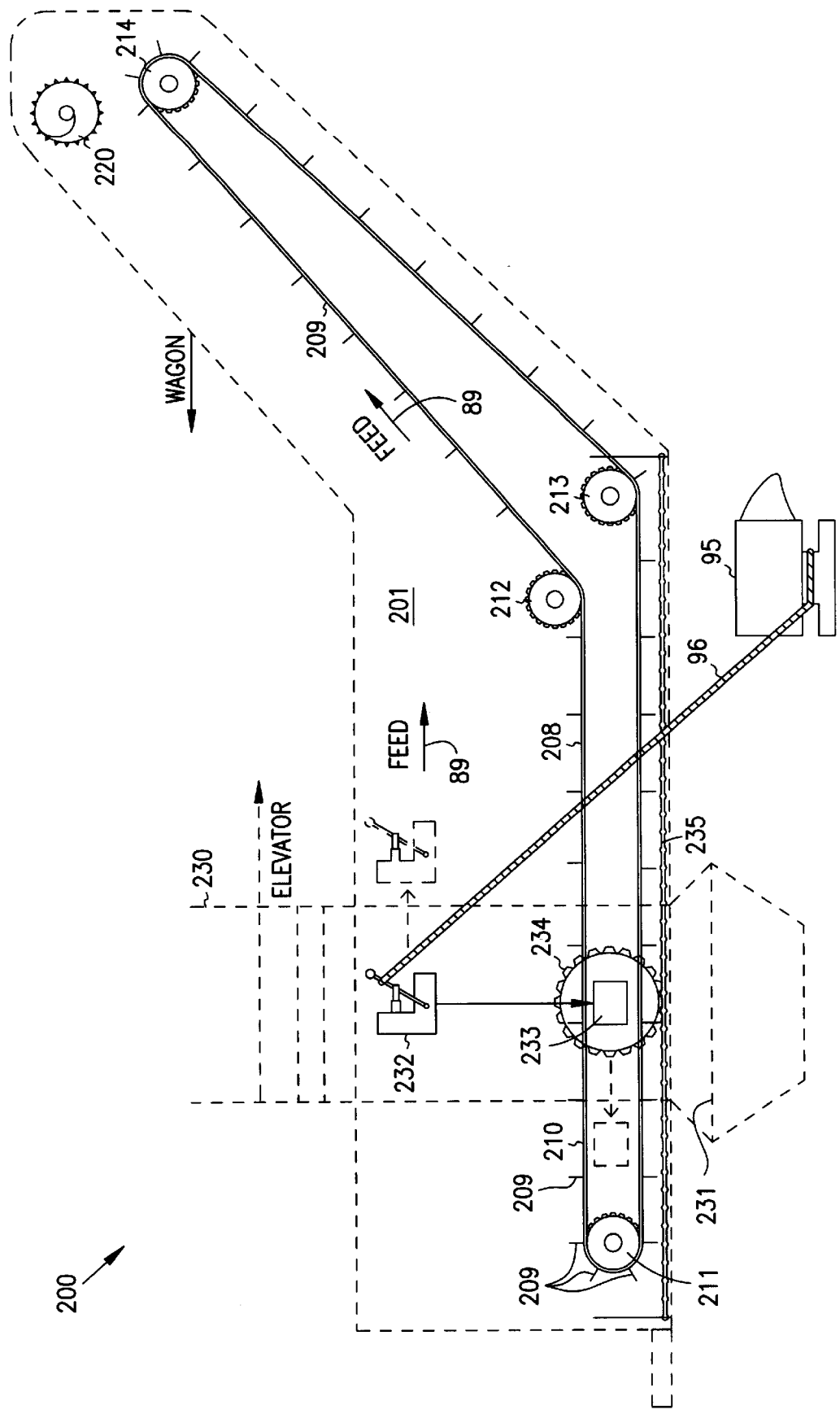
FIG. 2 shows a side view, partially in cross section, of one embodiment of the present invention, wagon table loader system 200.

FIG. 2 shows a side view, partially in cross section, of one aspect of the present invention, wagon table loader system 200. In some embodiments, table system 200 includes a relatively horizontal table section 208 and an inclined table section 207. In other embodiments (not shown), a single inclined table section is provided that extends from sprocket 211 to sprocket 214, wherein the single table section is at a moderately inclined angle.

In some embodiments, the relatively large table 208 can be loaded with an entire dump truck load of feed 89 by the truck backing up and tipping the load onto wagon 200. Alternatively, a large front-end loader can pick up a large amount of feed 89 and deposit that onto table 208. This allows that loading equipment to then leave and perform other duties, rather than waiting for their feed to be slowly loaded.

In other embodiments, a side elevator 230 is provided (see also FIG. 3) to lift feed stock into wagon 200 and onto table 208. In some such embodiments, a mechanism (e.g., in one embodiment, motor 233, its controller 232, and sprocket 234 and chain 235) is provided to maintain elevator 230 is a substantially fixed position relative to the ground, while system 100 including wagon 200 and extruder/tunnel 101 is moved ahead (to the left in FIG. 2) by feed extruding into bag 99. In the embodiment shown, a weight 95 or a stake hold one end of rope 96 in place. When pulled taut by the movement of system 100, rope 96 activates hydraulic valve 232 which powers hydraulic motor 233 to rotate sprocket 234, thus moving elevator 230 along chain 235 in the relative direction of the dashed arrow on FIG. 2. The fluid for this system is typically provided by a pump on the tractor that powers bagger system 100, or other suitable source. In other embodiments, other mechanisms (such as electric motors) are used. Once the elevator 230 reaches the end of its travel along wagon 200, valve 232 is activated in the opposite direction to move elevator 230 again to the leftmost end of wagon 200. This allows the relatively low elevator hopper 231 to remain in a fixed position for a relatively long period of time (as bagger 100 moves ten feet or so), for situations where the supply of feed needs such an elevator.

In some embodiments, an auger 220 is provided to limit the height of the feed being moved from table 208 into hopper 110, and/or to spread the feed more evenly across the width of wagon 200. In some embodiments, another such auger (not shown) is provided along the top of hopper 110, either alternatively or in addition to auger 220, in order to more evenly spread feed along the entire length of rotor 121. In some embodiments, auger 220 is a helical screw equipped with teeth (e.g., triangles about two inches (5 cm.) high and about two and a half inches (about 6 cm.) along their base) along the edge of the helix. In some embodiments, auger 220 is a two-part or four-part helix (i.e., some clockwise portions and some counterclockwise portions) to move feed outward from the center and/or inward from the edges of table 207 as the feed passes under rotating auger 220.

Figure 3:
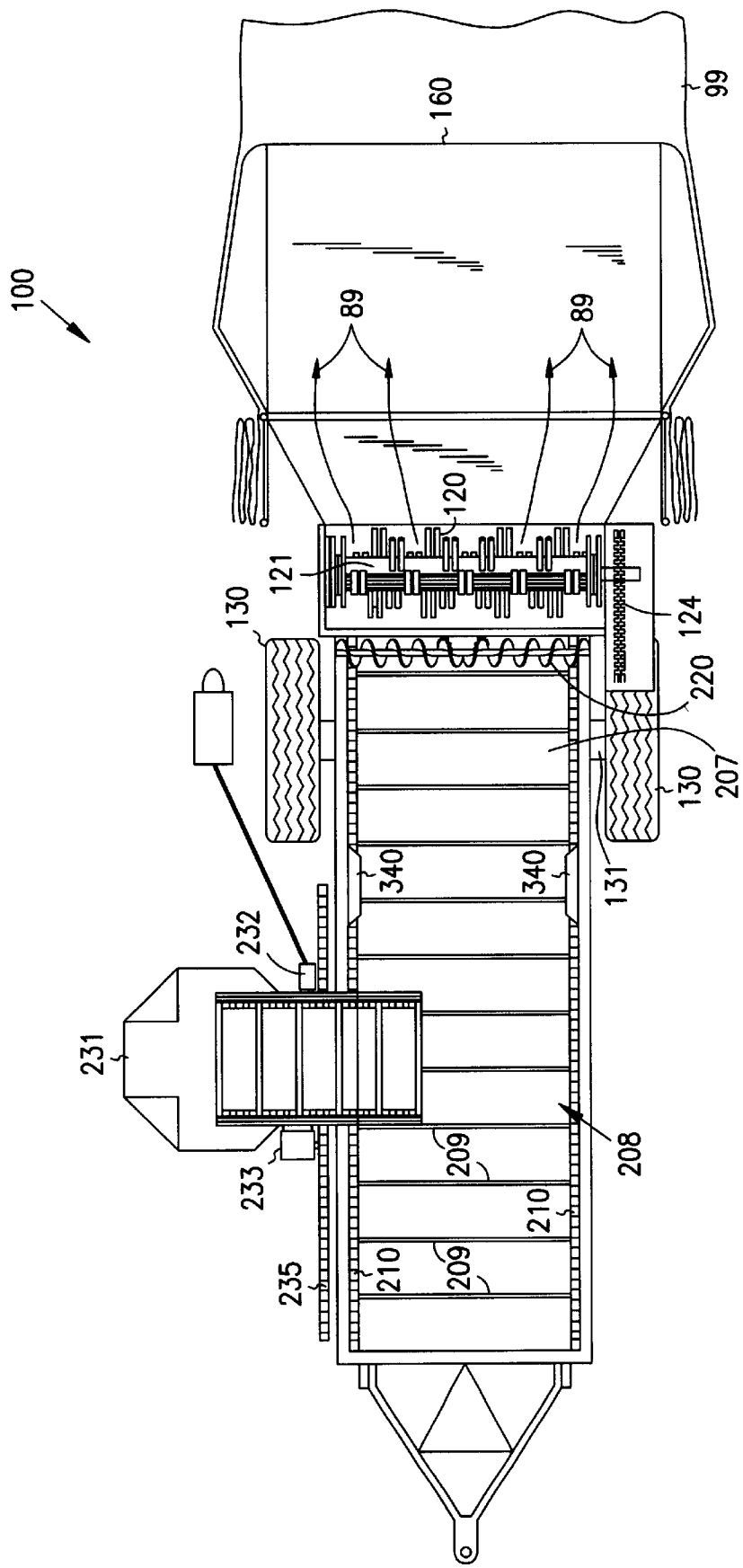
FIG. 3 shows a top view, partially in cross section, of one embodiment of the present invention, agricultural bagger system 100.

FIG. 3 shows a top view, partially in cross section, of one embodiment of the present invention, agricultural bagger system 100. A plurality of crossbars 209 are moved by chains 210 (from left to right in FIG. 3), in order to move the feed along table 208 and 207 towards and into hopper 110, which drops the feed to teeth 120 that compress the feed into tunnel, which extrudes the feed into bag 99 at the right. In some embodiments, tapered covers 340 attached to walls 201 of wagon 200 cover the middle sprockets 212.

Figure 4:
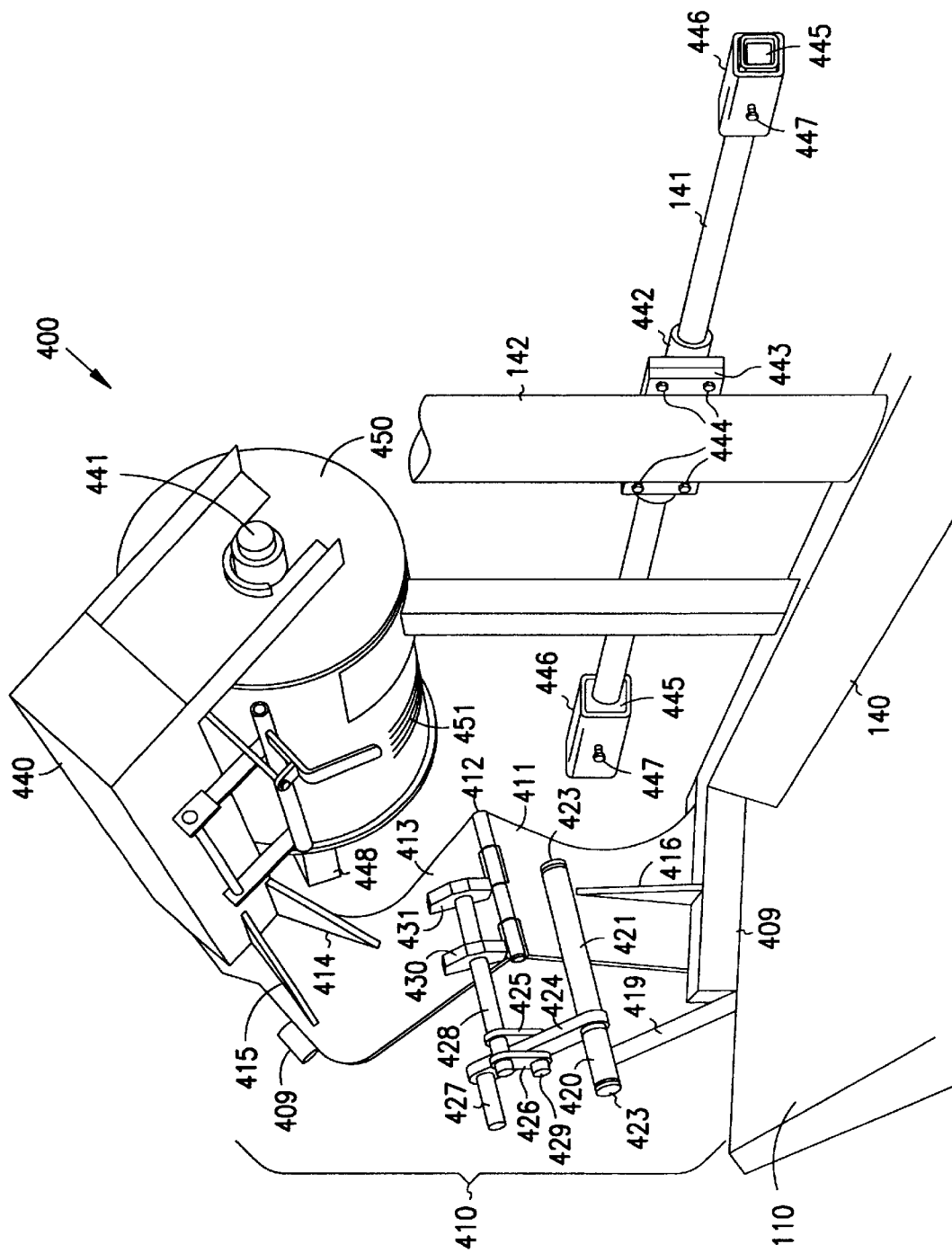
FIG. 4 shows a perspective view, partially in cross section, of one embodiment of the present invention, hinged brake system 400.

FIG. 4 shows a perspective view, partially in cross section, of one embodiment of the present invention, hinged brake system 400. Hinge 410 allows the drums 450 to be folded up to a transport position, or folded down into an operating position. In FIG. 4, brake drum 450 of one end is shown in the folded-up position. In a conventional bagger system, shaft 141 is a single piece that extends between two brake drums 450, and is also attached to a disk-brake that places tension on the cable deployed from drums 450, in order to regulate the amount of compression on the extruded feed. In one embodiment, the present invention cuts axle 141 into three sections: center section 141, and two end sections 441 that are attached to the two respective drums 450, as well as to the disk brake (see FIG. 7). A piece of square stock 445 (e.g., in one embodiment, two inches by two inches) is welded to both ends of center shaft 141, and a piece of square stock 448 is welded to the inner end of both end shafts 441. When both end shafts 441 are in the deployed lowered position, a pair of sleeves of square tubing 446 are slid over both square stock ends 445 and 448 at each respective end of center shaft 141, in order to reconnect the three parts of the shaft together, such that they all rotate together, and brake 750 can place tension on both drums 450. In one embodiment, center shaft 141 is held to post 142 through sleeve 442. Sleeve 442 includes a welded plate that bolts to plate 443 (which is welded to post 142. Bolts 444 pass through elongated slots in plate 443, allowing the angle and/or position of center shaft 141 to be adjusted, in order that center shaft 141 aligns with end shafts 441.

Similarly, the support beam is cut into three sections: center section 140, and two end beam sections 440 that are attached to support the two respective drums 450. In some embodiments, the support beam (140 and two 440 portions) is formed from a steel tube approximately eight inches by six inches made from half-inch thick steel, and end beam 409 is a steel tube approximately six inches by six inches made from half-inch thick steel. Fixed hinge plate 411 is welded to end beam 409 and braced by plate 416. Axle tube 421 (which surrounds hinge pin 423) is welded to fixed hinge plate 411 at an angle that matches the angle of hinge pin 412 and hinge pin 428. The other end of hinge pin 423 is held by hinge tube 420 that is welded to brace 419, which is welded to beam 409 and the frame of the hopper 110 in a fixed position.

Figure 6E:
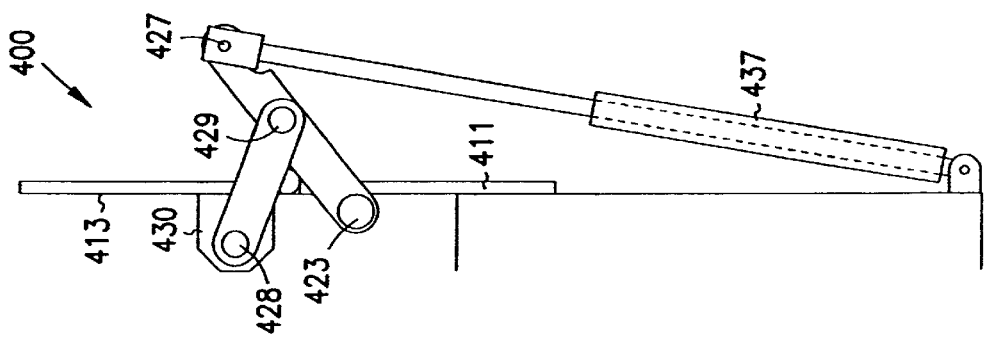
FIGS. 6A, 6B, 6C, 6D, and 6E, together form a "FIG. 6" that shows cable-drum-lifter system 500 in five different positions as upper hinge plate 413 is lifted.
Figure 6D:
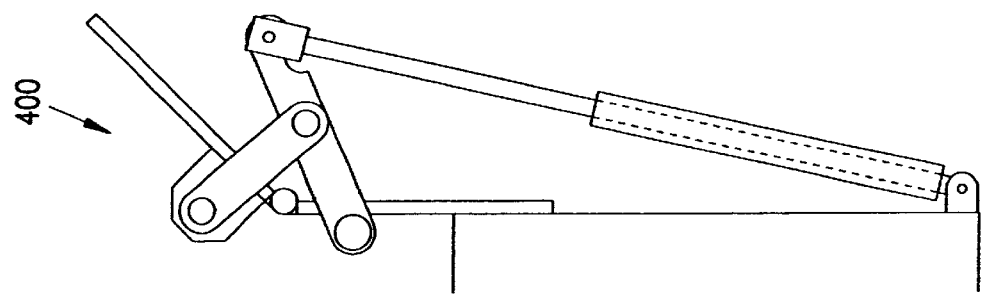
Figure 6C:
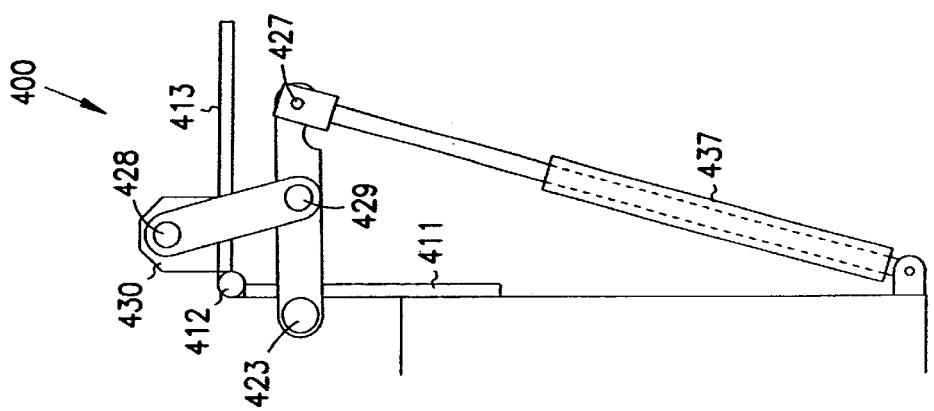
Figure 6B:
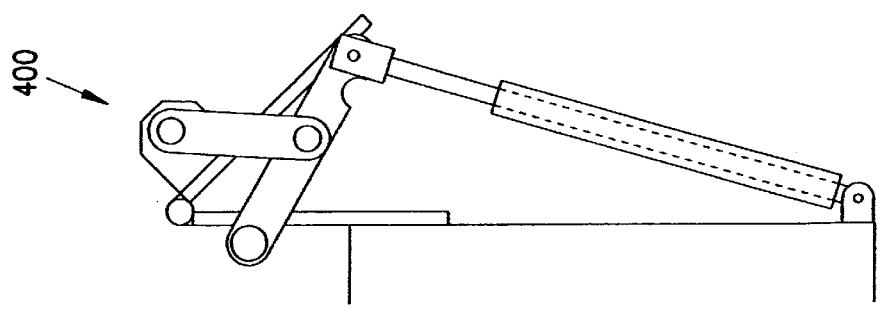
Figure 6A:
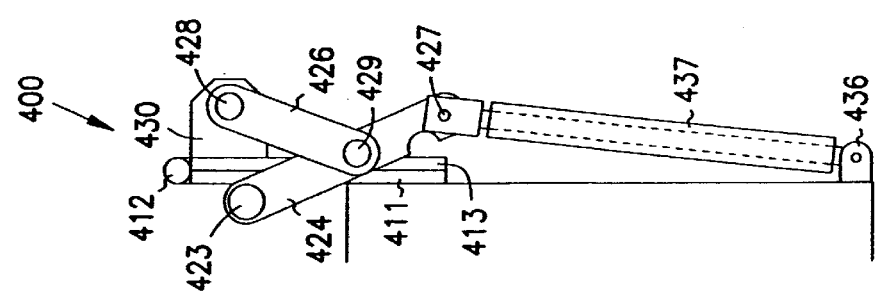
Figure 7:
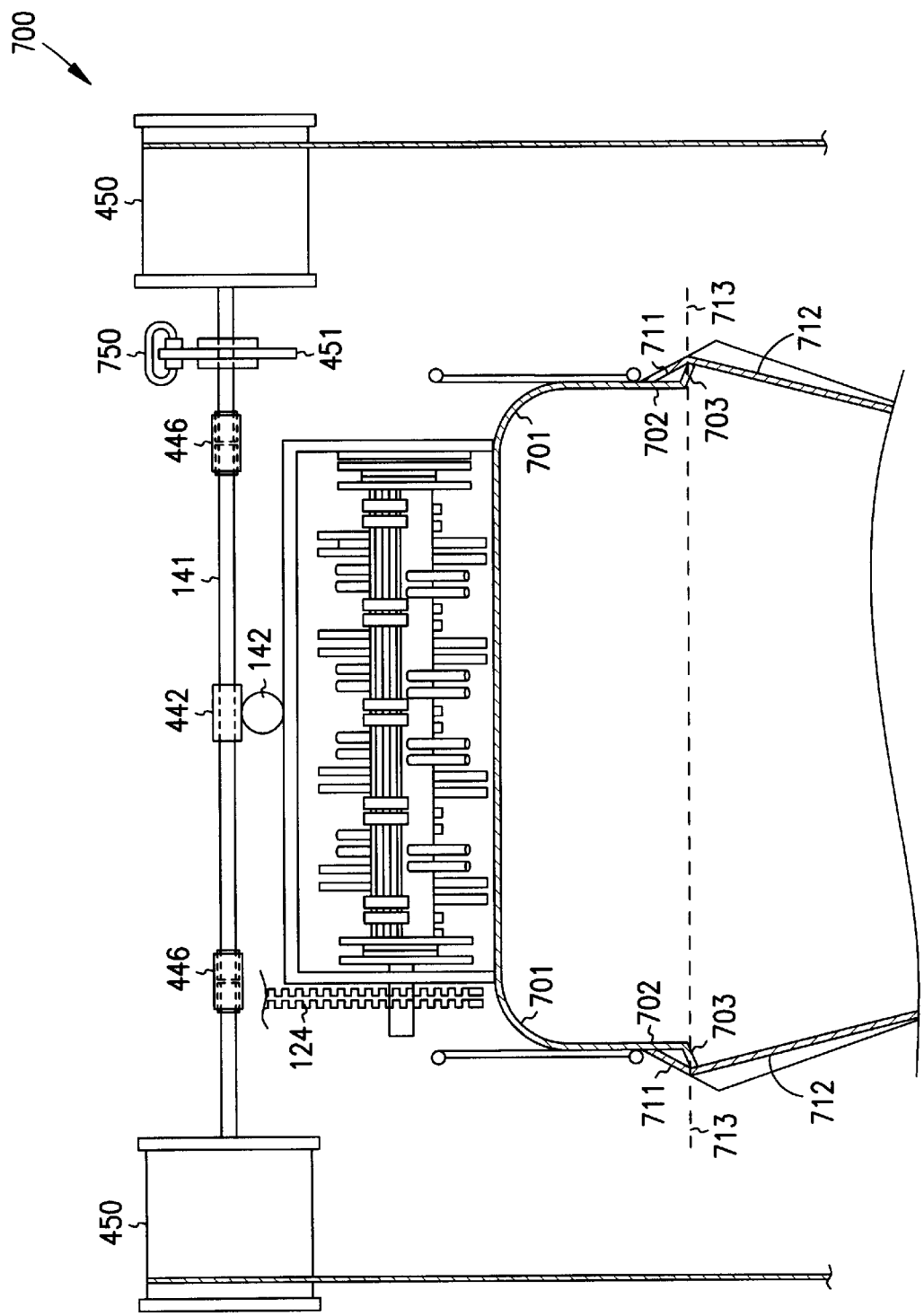
FIG. 7 shows a top view, partially in cross section, of one embodiment of the present invention, replacement-tunnel-welding system 700.

In some embodiments, a hydraulic cylinder 437 (see FIG. 6A) is movably attached to pin 427 to either lift drum 450 into the folded position shown in FIG. 4 and FIG. 6E, or lower drum 450 into the deployed position shown in FIG. 6A and FIG. 7. Lifting the far end of pin 427 rotates bar 424 around hinge pin 423, thus raising double bars 425 and 426 that are attached to bar 424 using pin 429. Double bars 425 and 426, in turn, lift hinge pin 428 to raise movable hinge plate 413, which rotates around hinge pin 412 to a full upright position. Plates 430 and 431 are welded to movable hinge plate 413 and to one end of hinge pin 428. Also welded to movable hinge plate 413 and to end beam section 440 are two triangular braces 414 and 415.

Thus, in the deployed position, the three parts of the shaft (441, 141, 441) align end-to-end and the three parts of the beam (440, 140, 440) align end-to-end, providing a configuration similar to a conventional brake and drum system. However, a folded position is also provided, reducing the width of bagger system 100 for transport. In some embodiments, the fold line of the hinge system (i.e., the axis of hinge pin 412) is at an angle to horizontal, in order that the drums 450 not only fold upward, but also somewhat forward of their down position. This provides a more compact folded position (i.e., less total height), and avoids interference with the forward end of tunnel 160.

Figure 5:
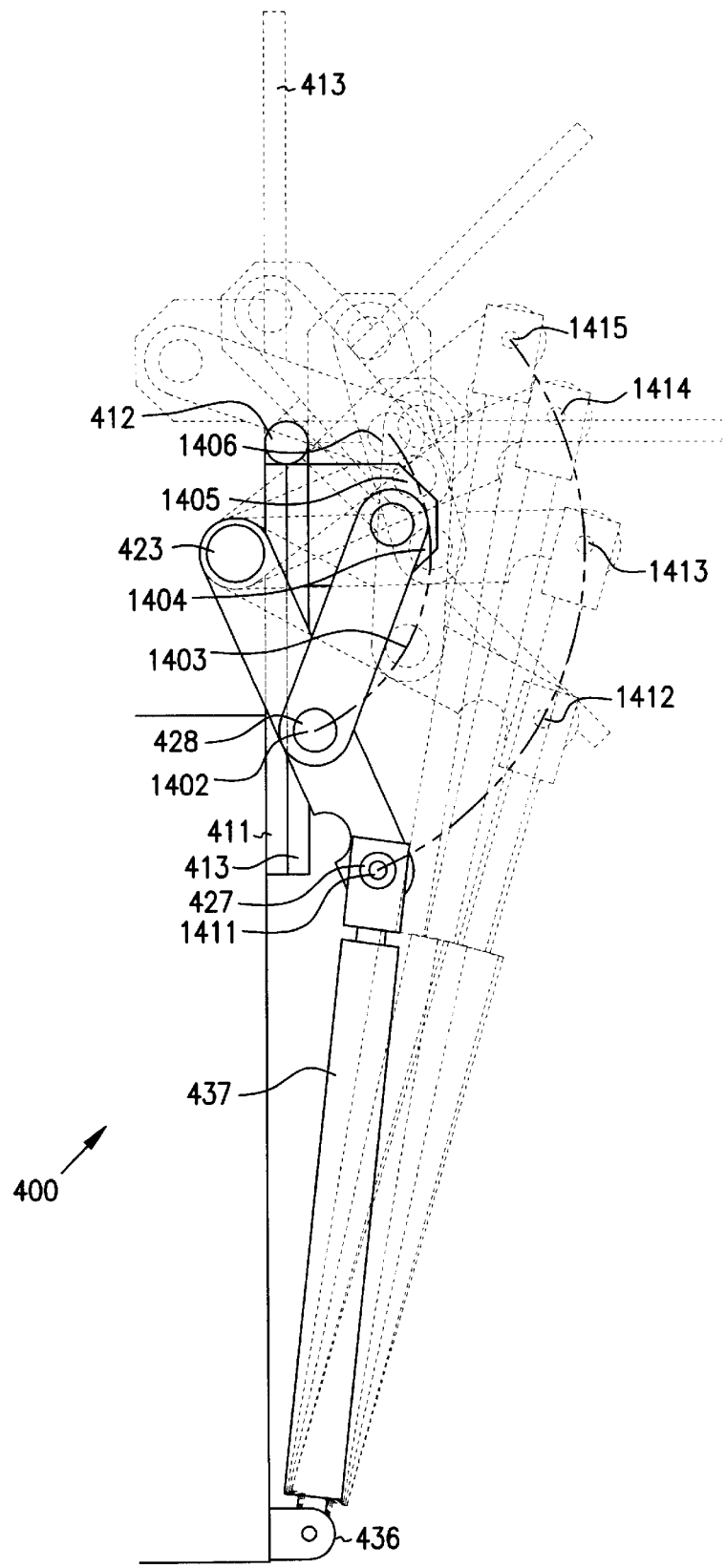
FIG. 5 shows an angled end view, partially in cross section, of one embodiment of the present invention, cable-drum-lifter system 500.

FIG. 5 shows an angled end view (sighting along the axis of hinge pin 412), partially in cross section, of one embodiment of the present invention, cable-drum-lifter system 400 (multiple positions are shown in dotted lines). In the lowered (also called the deployed or operating) position, the upper end of the hydraulic cylinder 437 (where it attaches to pin 427) is at position 1411, the mid-pin 428 between bar 424 and double bars 425 and 426 is at position 1402, and movable hinge plate 413 is fully down and adjacent to fixed hinge plate 411 (see also FIG. 6A). As the piston of cylinder 437 partially extends (this is just a position as it moves), the upper end of the hydraulic cylinder 437 moves to position 1412, the mid-pin 428 between bar 424 and double bars 425 and 426 moves to position 1403 and movable hinge plate 413 moves to a 45-degree angle to fixed hinge plate 411 around hinge pin 412 (see FIG. 6B). As the piston of cylinder 437 further partially extends (this is just another position as it moves), the upper end of the hydraulic cylinder 437 moves to position 1413, the mid-pin 428 between bar 424 and double bars 425 and 426 moves to position 1404 and movable hinge plate 413 moves to a 90-degree angle to fixed hinge plate 411 around hinge pin 412 (see FIG. 6C). As the piston of cylinder 437 still further partially extends (this is just another position as it moves), the upper end of the hydraulic cylinder 437 moves to position 1414, the mid-pin 428 between bar 424 and double bars 425 and 426 moves to position 1405 and movable hinge plate 413 moves to a 135-degree angle to fixed hinge plate 411 around hinge pin 412 (see FIG. 6D). Finally, as the piston of cylinder 437 fully extends (this is the final folded position), the upper end of the hydraulic cylinder 437 (where it attaches to pin 427) moves to position 1415, the mid-pin 428 between bar 424 and double bars 425 and 426 moves to position 1406 and movable hinge plate 413 moves to a 180-degree angle to fixed hinge plate 411 around hinge pin 412 (see also FIG. 6E).

FIG. 6, which includes FIGS. 6A, 6B, 6C, 6D, and 6E, shows cable-drum-lifter system 500 in five individual different positions as upper hinge plate 413 is lifted, along with the cable drum 450, as just described for FIG. 5. FIG. 6A shows the operating position, FIG. 6E shows the folded position for transport, and FIGS. 6B, 6C, and 6D show transitory positions between those two positions.

FIG. 7 shows a top view, partially in cross section, of one embodiment of the present invention, replacement-tunnel-welding system 700. Drums 450 are shown in their operating position, with sleeves 446 attached to center shaft 141 and end shafts 441. Disk 751 and caliper 750 of the brake are attached to one of the two end shafts 441. Drums 450 slowly release cable to the end of the bag (downward in this FIG. 7), where they are attached to a backstop that holds the end of the filled bag.

FIG. 7 also shows a triangle-tube support formed of three sections of tunnel 702, 703, and 711. In some embodiments, a conventional short tunnel is cut off at approximately dashed line 713, and the edge 703 of the remaining tunnel is bent outward. Extended tunnel 712 has an inner edge 711 that is bent inward. These pieces are then place as shown, and welded together, both at the end of section 703 on the inside of the tunnel, and at the end of section 711 on the outside of the tunnel. The resulting triangle tube provides strength and stiffness.

In some embodiments, the extended tunnel 712 is then cut off using a torch, leaving the triangle tube as a fixed reference location for reattaching the separated tunnel 712. This provides a much shorter bagger configuration for shipping, since the extended tunnel end 712 can be packed elsewhere (e.g., in wagon 200), rather than extending the length of the machine. This allows the machine 100 to be loaded into a standard shipping container. When the machine reaches its final destination, the extended tunnel is again welded onto the machine, using the triangle tube as a stiff reference orientation.

Figure 8:
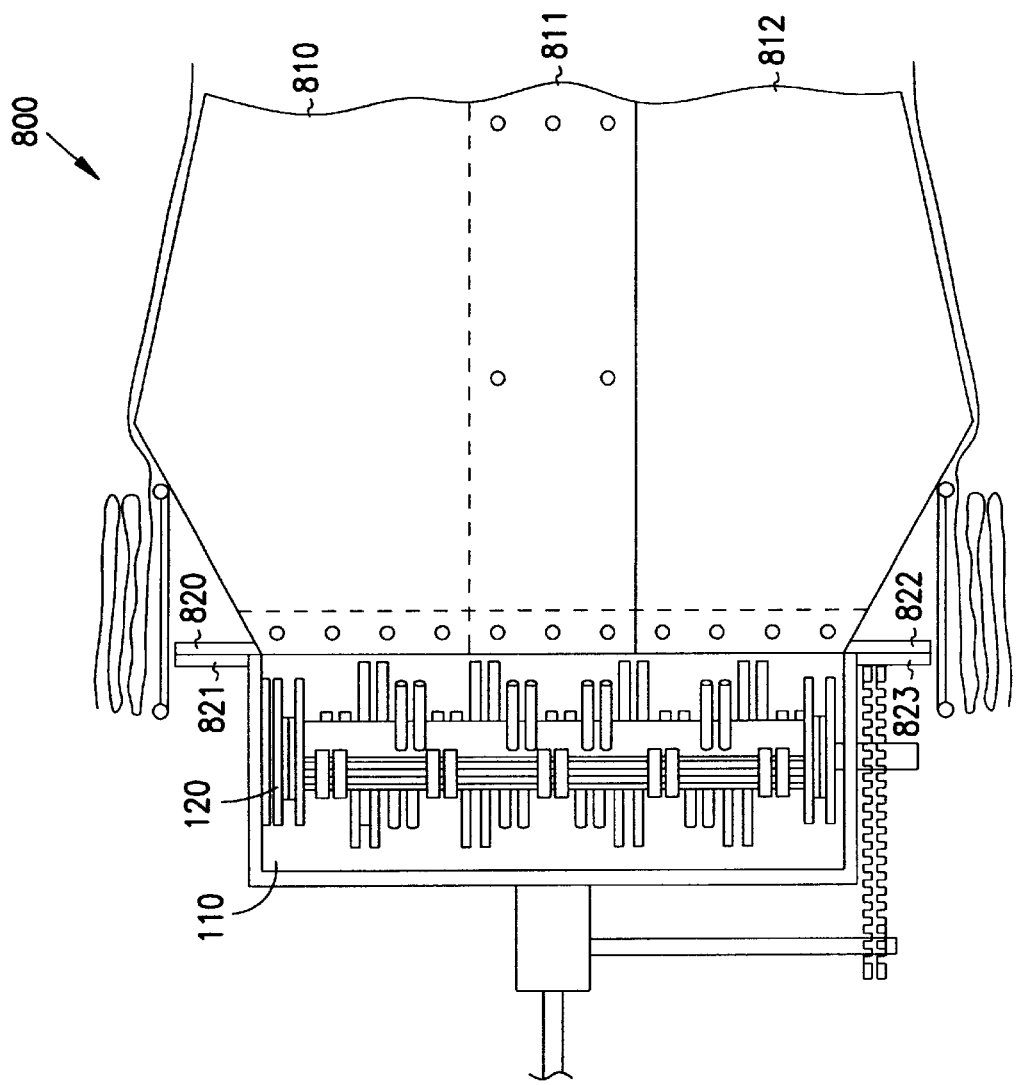
FIG. 8 shows a top view, partially in cross section, of one embodiment of the present invention, expandable-tunnel system 800 in a small-diameter-bag position.

FIG. 8 shows a top view, partially in cross section, of one embodiment of the present invention, expandable-tunnel system 800 in a small-diameter-bag position. In this embodiment, two tunnel halves 810 and 812 overlap at strip 811. In some embodiments, tunnel half 810 is welded to right front plate 820 that can be bolted to fixed plate 821 in either of two side-by-side positions, and tunnel half 812 is welded to right front plate 822 that can be bolted to fixed plate 823 in either of two side-by-side positions, in order to widen or narrow the diameter of the tunnel system 800. In other embodiments, holes drilled in both the bagger base portion and the two extended tunnel parts 810 and 812 align in two or more different overlapped-seam positions of the tunnel parts 810 and 812, allowing the two halves 810 and 812 to be bolted to one another and to the rest (base portion) of system 100 in any one of a plurality of different-width positions. In some embodiments, both the plate connections and the overlapping seams with bolts are used. In yet other embodiments (not shown), a slidable tongue-and-groove connection system is used, alone or with other connection systems as described above.

For example, in some embodiments, the narrow position accommodates ten-foot-diameter bags, while the widened position accommodates twelve-foot-diameter bags. In other embodiments, other bags sizes are accommodated, and/or a greater number of different sizes can be used.

Figure 9:
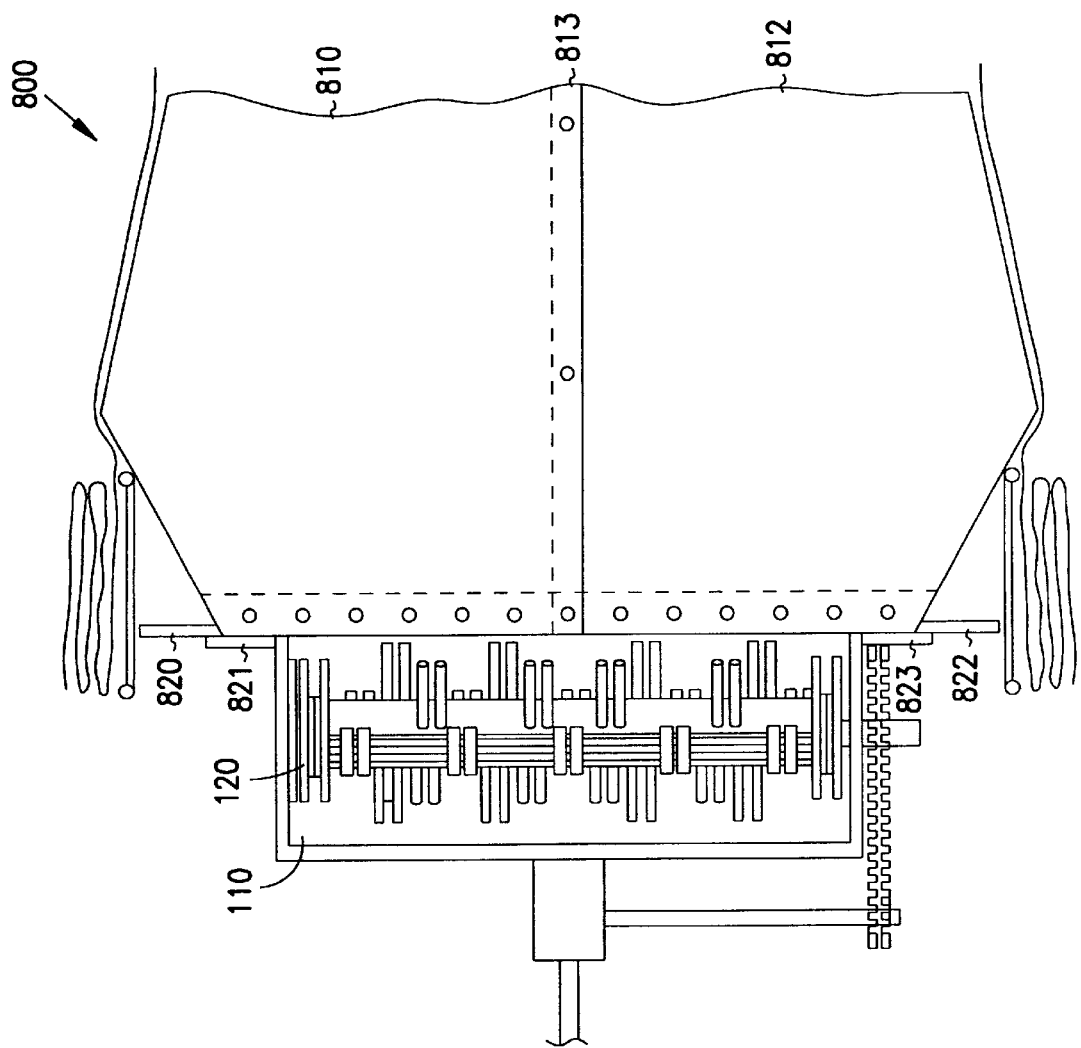
FIG. 9 shows a top view, partially in cross section, of one embodiment of the present invention, expandable-tunnel system 800 in a large-diameter-bag position.

FIG. 9 shows a top view, partially in cross section, of one embodiment of the present invention, expandable-tunnel system 800 in a large-diameter-bag position. In this position, the overlapped area 813 is much smaller that overlapped area 811 of FIG. 8, and the two halves 810 and 812 are bolted to one another and to the base portion.

In other embodiments (not shown) a boltable three-part tunnel system is provided, much the same as shown in FIG. 9, except that the width is not adjustable. That is, a base portion of the bagger machine is provided as shown in FIG. 9, along with two tunnel parts 810 and 812 which can be removed and detached from one another, but when assembled, there is only a single operating configuration. This embodiment provides the advantage of a removable, boltable tunnel that is removed for shipping, and then bolted in place for operation. In some such embodiments, the tunnel is also welded in place, once the machine reaches its final destination and is assembled.

FIG. 10 shows a perspective view of one embodiment of the present invention, bag-crane system 1000. This aspect of the present invention provides an extendable post that includes fixed post portion 142 and movable post portion 143 that can be positioned to one of a plurality of raised and/or lowered positions, and then fixed using fastener 1004 (e.g., a rod or bolt). Adjustable upper crane post 143 is welded to crane arm 144 having a track that supports a wheeled bag lifter winch 145, that in turn raises or lowers winch cable 146 that holds upper bag tray 147 (see FIG. 1). In some embodiments, winch 145 is an electric winch controlled by switch 1002 at the end of a cable. In other embodiments, a wireless or other control mechanism is used. A conventional bag lift has a post to one side of its tunnel. By moving the vertical post to the centerline of tunnel 160, a bag can be lifted and aligned more easily onto tunnel 160. The electric winch provides further safety and convenience, compared to conventional techniques.

Figure 11:
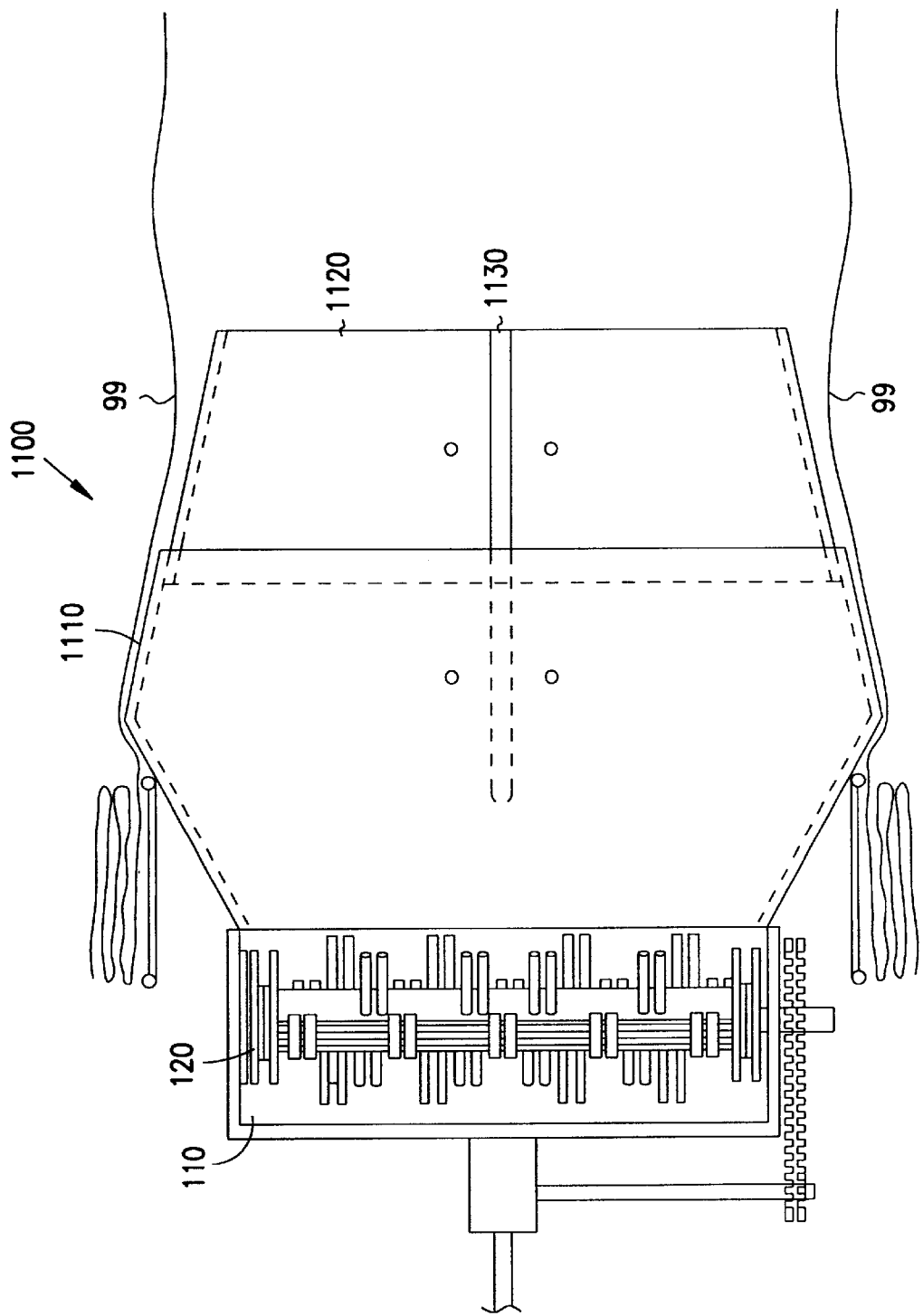
FIG. 11 shows a top view, partially in cross section, of one embodiment of the present invention, shortenable-tunnel system 1100 in a extended-length position.

FIG. 11 shows a top view, partially in cross section, of one embodiment of the present invention, shortenable-tunnel system 1100 in a extended-length position. In this embodiment, tunnel 160 includes fixed tunnel base 1110 and movable tunnel extension 1120, slidably attached to one another using tongue-and-groove channel 1130. In the extended (operating) position, fixed tunnel base 1110 and movable tunnel extension 1120 are bolted to one another (e.g., by carriage bolts and holes not shown) to form an extended length tunnel much like tunnel 160 of FIG. 1.

Figure 12:
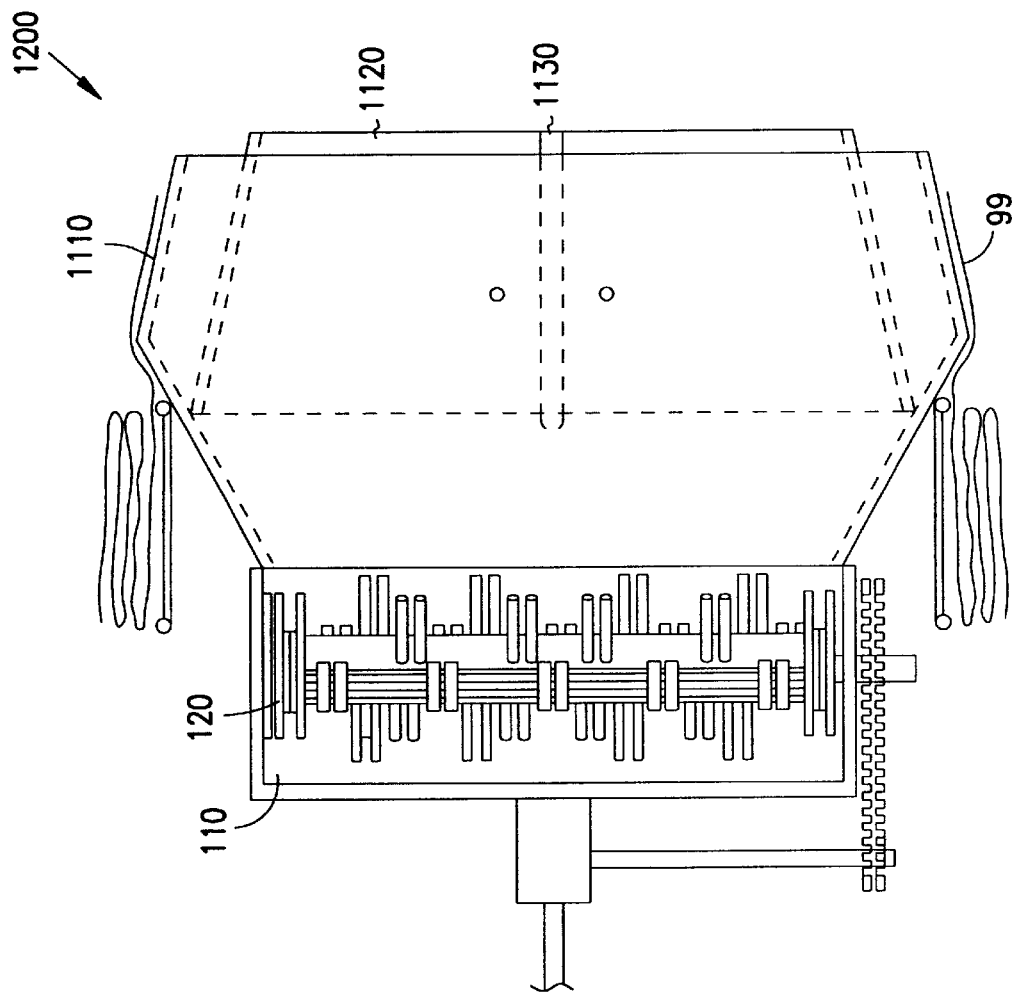
FIG. 12 shows a top view, partially in cross section, of one embodiment of the present invention, shortenable-tunnel system 1100 in a shortened-length position.

FIG. 12 shows a top view, partially in cross section, of one embodiment of the present invention, shortenable-tunnel system 1100 in a shortened-length position. By allowing the tunnel to collapse in this fashion, the machine 1100 can be made much shorter for shipping overseas or for travel down farm roads having limited capacity for large vehicles. In other embodiments (not shown), tunnel 160 is formed of three or more collapsing sections, in a manner similar to that described for two sections here.

Figure 13:
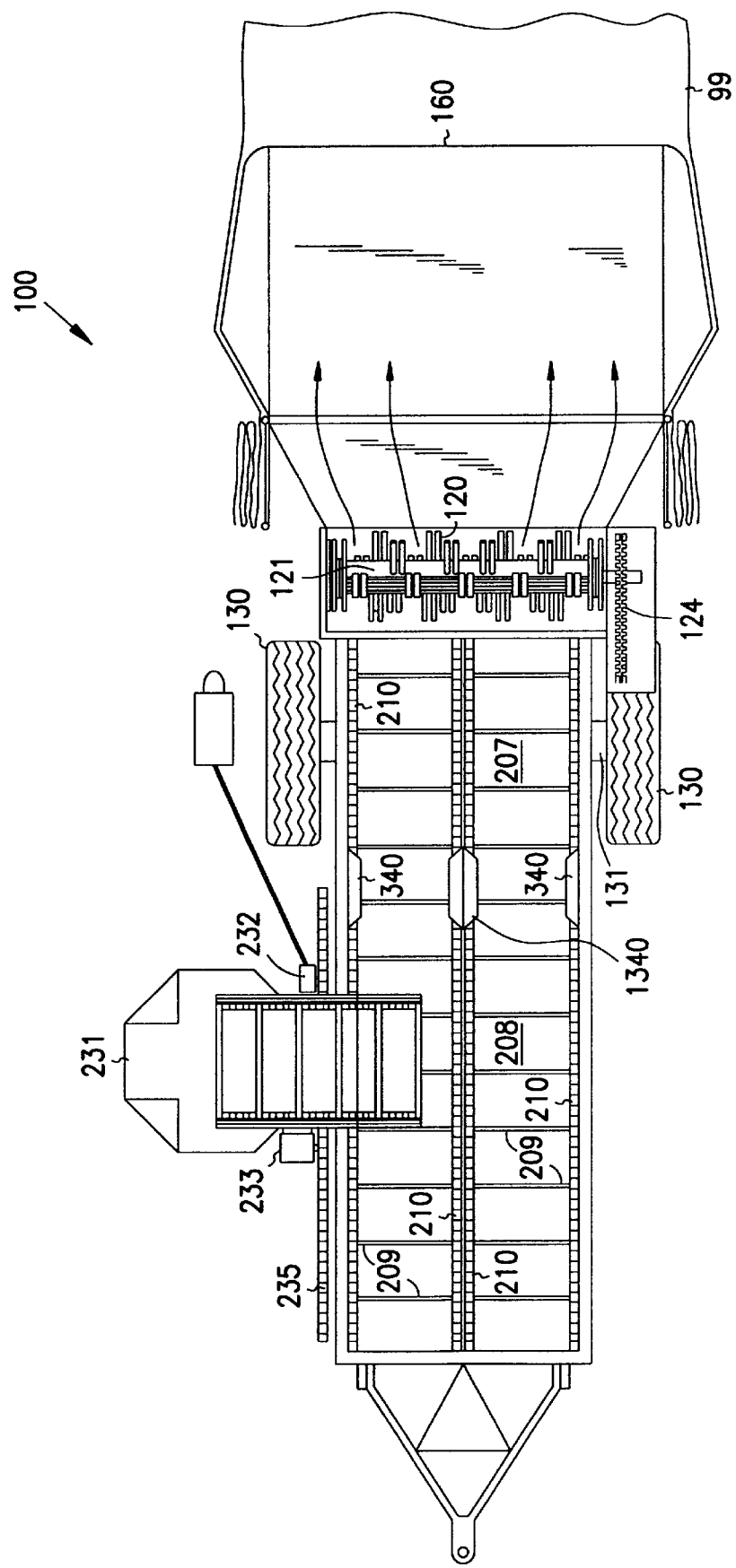
FIG. 13 shows a top view, partially in cross section, of one embodiment of the present invention, agricultural bagger system 1300.

FIG. 13 shows a top view, partially in cross section, of one embodiment of the present invention, agricultural bagger system 1300 that includes a center covered sprocket 1400 (including cover 1340) and dual chain/bar sets. In this embodiment, two aprons each having a pair of chains are provided, such that cross bars 209 are only half as long as in the embodiment of FIG. 3, in order that the cross bars 209 do not bend or sag as much when put under heavy load such as moving a very large pile of feed. Four sets of sprockets (i.e., four each of 211, 212, 213, 214) are provided to move the two pairs of chains 210 on their respective aprons.

Sprockets 211, 213, and 214 are located under the chains (on the opposite side to the feed), but sprockets 212 are located above (in the feed), and thus (in some embodiments) are provided with tapered covers 340 and 1340.

Figure 14:
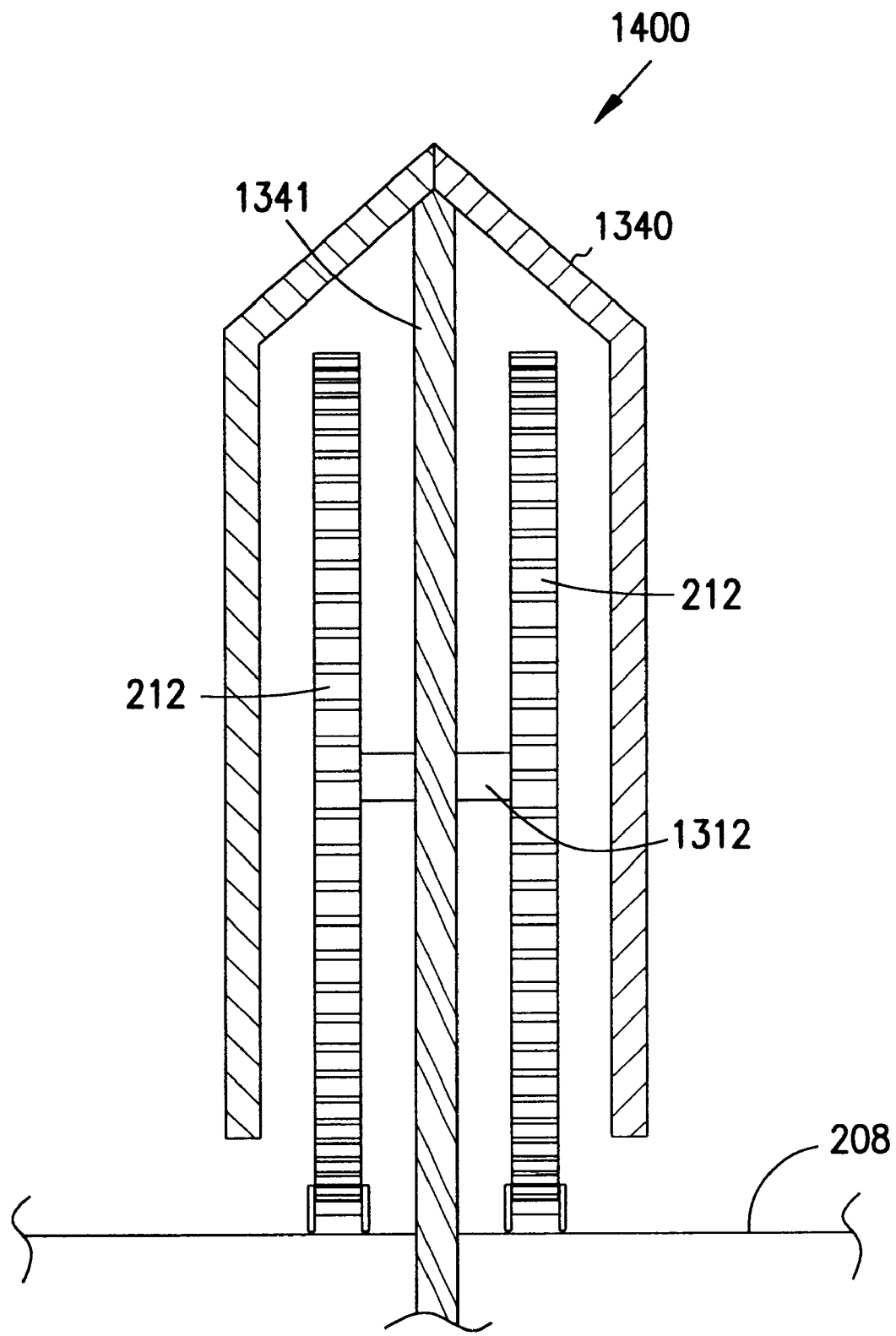
FIG. 14 shows a front view, partially in cross section, of one embodiment of the present invention, covered sprocket 1400.

FIG. 14 shows a front view, partially in cross section, of one embodiment of the present invention, center covered sprocket 1400. Plate 1341 is oriented vertically in the center of wagon 1300, and with its plane parallel to the flow of the feed along table 208. Plate 1341 holds axle 1312, and rotatably mounted on both ends of axle 1312 are sprockets 212. Tapered cover 1340 diverts the feed from the front, top, back, and sides of sprockets 212, while allowing the chains 210 to pass beneath.

CONCLUSION

One aspect of the present invention provides an improved method for loading agricultural feed into a horizontally deployed bag. This method includes providing an extruder rotor having an input hopper and an output tunnel, the input hopper having a capacity to hold feed, providing a buffer table having a capacity to hold feed that is larger than the capacity of the hopper, and deploying the bag from the forward end of the tunnel towards a rearward end of the tunnel. This method also includes unloading onto the buffer table an amount of feed that is greater than the capacity of the hopper, conveying the feed along the buffer table towards and into the hopper, compacting the feed with the extruder rotor, from the tunnel forward end, into the tunnel between the forward and rearward ends, and extruding the feed from the rearward end of the tunnel into the bag.

Some embodiments further include reducing in circumference the feed as the feed passes towards the rearward end of the tunnel, and stretching the bag circumferentially with the tunnel between the forward and rearward ends, and then reducing in circumference the bag.

In some embodiments of the method, the tunnel is of sufficient length such that the step of compacting the feed occurs substantially only within the tunnel.

Some embodiments of the method further include automatically limiting a height of the feed from the buffer table before the feed enters the hopper.

Some embodiments of the method further include automatically spreading the feed across a width of the buffer table before the feed enters the hopper.

Some embodiments of the method further include automatically spreading input feed substantially evenly over a length of the extruder rotor.

Some embodiments of the method further include expanding the tunnel from a first configuration suitable to fill a bag having a first diameter to a second configuration suitable to fill a bag having a second diameter larger than the first diameter.

Some embodiments of the method further include lifting input feed with a loading elevator onto the buffer table, and automatically moving the loading elevator relative to the buffer table such that the loading elevator remains in substantially fixed position as the buffer table and extruder move due to the bag being filled.

Another aspect of the present invention provides an agricultural feed stock loading apparatus for loading feed into a feed bag. This apparatus includes an extruder rotor having an input hopper and an output tunnel, the input hopper having a capacity to hold feed, a buffer table having a capacity to hold feed that is larger than the capacity of the hopper, the buffer table coupled to the input hopper, a bag holder that holds the bag to be deployed from the forward end of the tunnel towards a rearward end of the tunnel, and a mechanism that moves the feed along the buffer table towards and into the hopper.

In some embodiments of the apparatus, the tunnel is of sufficient length and taper to substantially prevent feed from stretching the feed bag after the feed bag leaves the rearward end of the tunnel.

In some embodiments of the apparatus, the tunnel is of sufficient length such that the step of compacting the feed occurs substantially only within the tunnel.

Some embodiments of the apparatus further include an auger mounted between a loading area of the buffer table and the hopper, and operable to automatically limit a height of the feed from the buffer table before the feed enters the hopper.

Some embodiments of the apparatus further include a spreader mounted between a loading area of the buffer table and the hopper, and operable to automatically spread the feed across a width of the hopper.

In some embodiments of the apparatus, the tunnel includes two parts that can be attached to one another in a first configuration suitable to fill a bag having a first diameter, and can be attached to one another in a second configuration suitable to fill a bag having a second diameter larger than the first diameter.

Some embodiments of the apparatus further include a loading elevator operable to lift feed onto the buffer table, and an automatic moving mechanism that moves the loading elevator relative to the buffer table such that the loading elevator remains in substantially fixed position as the buffer table and extruder move due to the bag being filled.

Yet another aspect of the present invention provides an improved feed tunnel for use with an agricultural feed stock loading apparatus for loading feed into a horizontal, ground-supported feed bag. This tunnel includes at least two parts that can be attached to one another in a first configuration suitable to fill a bag having a first diameter, and can be attached to one another in a second configuration suitable to fill a bag having a second diameter larger than the first diameter.

In some embodiments, the tunnel is of sufficient length and taper to substantially prevent pressure increases within the feed after the feed exits the tunnel.

In some embodiments, the tunnel is of sufficient length to substantially even out pressure differentials within the feed before the feed exits the tunnel.

In some embodiments, the tunnel comprises a left part and a right part, and wherein the left part and right part are attached to one another in a more overlapped orientation in the first configuration, and are attached to one another in a less overlapped orientation in the second configuration.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for loading agricultural feed into a horizontally deployed bag comprising:

providing an extruder rotor having an input hopper and an output tunnel, the input hopper having a capacity to hold feed;

providing a buffer table having a capacity to hold feed that is larger than the capacity of the hopper;

deploying the bag from the forward end of the tunnel towards a rearward end of the tunnel;

unloading onto the buffer table an amount of feed that is greater than the capacity of the hopper;

conveying the feed along the buffer table towards and into the hopper;

automatically limiting a height of the feed from the buffer table before the feed enters the hopper;

compacting the feed with the extruder rotor, from the tunnel forward end, into the tunnel between the forward and rearward ends;

extruding the feed from the rearward end of the tunnel into the bag; and expanding the tunnel from a first configuration suitable to fill a bag having a first diameter to a second configuration suitable to fill a bag having a second diameter larger than the first diameter.

2. A method for loading agricultural feed into a horizontally deployed bag comprising:

providing an extruder rotor having an input hopper and an output tunnel, the input hopper having a capacity to hold feed;

providing a buffer table having a capacity to hold feed that is larger than the capacity of the hopper;

deploying the bag from the forward end of the tunnel towards a rearward end of the tunnel;

unloading onto the buffer table an amount of feed that is greater than the capacity of the hopper;

conveying the feed along the buffer table towards and into the hopper;

automatically limiting a height of the feed from the buffer table before the feed enters the hopper;

compacting the feed with the extruder rotor, from the tunnel forward end, into the tunnel between the forward and rearward ends;

extruding the feed from the rearward end of the tunnel into the bag;

lifting input feed with a loading elevator onto the buffer table; and automatically moving the loading elevator relative to the buffer table such that the loading elevator remains in substantially fixed position as the buffer table and extruder move due to the bag being filled.

3. An agricultural feed stock loading apparatus for loading feed into a feed bag, comprising:

an extruder rotor having an input hopper and an output tunnel, the input hopper having a capacity to hold feed;

a buffer table having a capacity to hold feed that is larger than the capacity of the hopper, the buffer table coupled to the input hopper;

a height-limiting device mounted between a loading area of the buffer table and the hopper, and operable to automatically limit a height of the feed from the buffer table before the feed enters the hopper;

a bag holder that holds the bag to be deployed from the forward end of the tunnel towards a rearward end of the tunnel; and a mechanism that moves the feed along the buffer table towards and into the hopper, wherein the tunnel comprises two parts that can be attached to one another in a first configuration suitable to fill a bag having a first diameter, and can be attached to one another in a second configuration suitable to fill a bag having a second diameter larger than the first diameter.

4. An agricultural feed stock loading apparatus for loading feed into a feed bag, comprising:

an extruder rotor having an input hopper and an output tunnel, the input hopper having a capacity to hold feed;

a buffer table having a capacity to hold feed that is larger than the capacity of the hopper, the buffer table coupled to the input hopper;

a height-limiting device mounted between a loading area of the buffer table and the hopper, and operable to automatically limit a height of the feed from the buffer table before the feed enters the hopper;

a bag holder that holds the bag to be deployed from the forward end of the tunnel towards a rearward end of the tunnel;

a mechanism that moves the feed along the buffer table towards and into the hopper, a loading elevator operable to lift feed onto the buffer table; and an automatic moving mechanism that moves the loading elevator relative to the buffer table such that the loading elevator remains in substantially fixed position as the buffer table and extruder move due to the bag being filled.

5. An agricultural feed stock loading apparatus for loading feed into a feed bag, comprising:

extruder means having an input hopper and an output tunnel, the input hopper having a capacity to hold feed;

buffer means having a capacity to hold feed that is larger than the capacity of the hopper, the buffer means coupled to the input hopper;

loading elevator means for lifting feed onto the buffer table;

automatic moving means for moving the loading elevator means relative to the buffer means such that the loading elevator remains in substantially fixed position as the buffer means and extruder move due to the bag being filled;

a bag holder that holds the bag to be deployed from the forward end of the tunnel towards a rearward end of the tunnel; and means for moving the feed along the buffer means towards and into the hopper.

6. The apparatus of claim 5, wherein the tunnel is of sufficient length and taper to substantially prevent feed from stretching the feed bag after the feed bag leaves the rearward end of the tunnel.

7. The apparatus of claim 5, further comprising:

an auger mounted between a loading area of the buffer means and the hopper, and operable to automatically limit a height of the feed from the buffer means before the feed enters the hopper.

8. The apparatus of claim 5, further comprising:

a spreader mounted between a loading area of the buffer means and the hopper, and operable to automatically spread the feed across a width of the hopper.

9. An improved method for loading agricultural feed into a horizontally deployed bag comprising:

providing an extruder rotor having an input hopper and an output tunnel, the input hopper having a capacity to hold feed;

expanding the output tunnel from a first configuration suitable to fill a bag having a first diameter to a second configuration suitable to fill a bag having a second diameter larger than the first diameter;

providing a buffer table having a capacity to hold feed that is larger than the capacity of the hopper;

deploying the bag having the second diameter from the forward end of the tunnel towards a rearward end of the tunnel;

unloading onto the buffer table an amount of feed that is greater than the capacity of the hopper;

conveying the feed along the buffer table towards and into the hopper;

compacting the feed with the extruder rotor, from the tunnel forward end, into the tunnel between the forward and rearward ends; and extruding the feed from the rearward end of the tunnel into the bag having the second diameter.

10. The method of claim 9, further comprising:

reducing in circumference the feed as the feed passes towards the rearward end of the tunnel, wherein the tunnel is of sufficient length such that the compacting of the feed occurs substantially only within the tunnel; and stretching the bag circumferentially with the tunnel between the forward and rearward ends, and then reducing in circumference the bag.

11. The method of claim 9, further comprising:

automatically spreading the feed across a width of the buffer table before the feed enters the hopper.

12. An improved method for loading agricultural feed into a horizontally deployed bag comprising:

providing an extruder rotor having an input hopper and an output tunnel, the input hopper having a capacity to hold feed;

providing a buffer table having a capacity to hold feed that is larger than the capacity of the hopper;

deploying the bag from the forward end of the tunnel towards a rearward end of the tunnel;

lifting input feed with a loading elevator onto the buffer table; and automatically moving the loading elevator relative to the buffer table such that the loading elevator remains in substantially fixed position as the buffer table and extruder move due to the bag being filled;

unloading from the loading elevator onto the buffer table an amount of feed that is greater than the capacity of the hopper;

conveying the feed along the buffer table towards and into the hopper;

compacting the feed with the extruder rotor, from the tunnel forward end, into the tunnel between the forward and rearward ends; and extruding the feed from the rearward end of the tunnel into the bag.

13. The method of claim 12, further comprising:

reducing in circumference the feed as the feed passes towards the rearward end of the tunnel, wherein the tunnel is of sufficient length such that the compacting of the feed occurs substantially only within the tunnel; and stretching the bag circumferentially with the tunnel between the forward and rearward ends, and then reducing in circumference the bag.

14. The method of claim 12, further comprising:

automatically spreading the feed across a width of the buffer table before the feed enters the hopper.

15. An agricultural feed stock loading apparatus for loading feed into a feed bag, comprising:

an extruder rotor having an input hopper and an output tunnel, the input hopper having a capacity to hold feed, wherein the tunnel comprises two parts that can be attached to one another in a first configuration suitable to fill a bag having a first diameter, and can be attached to one another in a second configuration suitable to fill a bag having a second diameter larger than the first diameter;

a buffer table having a capacity to hold feed that is larger than the capacity of the hopper, the buffer table coupled to the input hopper;

a bag holder that holds the bag to be deployed from the forward end of the tunnel towards a rearward end of the tunnel; and a mechanism that moves the feed along the buffer table towards and into the hopper.

16. The apparatus of claim 15, wherein the tunnel is of sufficient length and taper to substantially prevent feed from stretching the feed bag after the feed bag leaves the rearward end of the tunnel and such that the feed is compacted substantially only within the tunnel.

17. The apparatus of claim 15, further comprising:

an auger mounted between a loading area of the buffer table and the hopper, and operable to automatically limit a height of the feed from the buffer table before the feed enters the hopper.

18. The apparatus of claim 17, wherein the auger has teeth along an outer edge.

19. An agricultural feed stock loading apparatus for loading feed into a feed bag, comprising:

an extruder rotor having an input hopper and an output tunnel, the input hopper having a capacity to hold feed;

a buffer table having a capacity to hold feed that is larger than the capacity of the hopper, the buffer table coupled to the input hopper;

a loading elevator operable to lift feed onto the buffer table;

an automatic moving mechanism that moves the loading elevator relative to the buffer table such that the loading elevator remains in substantially fixed position as the buffer table and extruder move due to the bag being filled;

a bag holder that holds the bag to be deployed from the forward end of the tunnel towards a rearward end of the tunnel; and a mechanism that moves the feed along the buffer table towards and into the hopper.

20. The apparatus of claim 19, herein the tunnel is of sufficient length and taper to substantially prevent feed from stretching the feed bag after the feed bag leaves the rearward end of the tunnel and such that the feed is compacted substantially only within the tunnel.

21. The apparatus of claim 19, further comprising:

an auger mounted between a loading area of the buffer table and the hopper, and operable to automatically limit a height of the feed from the buffer table before the feed enters the hopper.

22. The apparatus of claim 21, wherein the auger has teeth along an outer edge.

* * * * *